United States Patent [19]
Frutiger

[11] 3,988,721
[45] Oct. 26, 1976

[54] PLUG-IN TYPE PROGRAM STORAGE

[75] Inventor: Peter Frutiger, Wangen, Switzerland

[73] Assignee: Anstalt Europaische Handelsgesellschaft, Vaduz, Liechtenstein

[22] Filed: Jan. 16, 1976

[21] Appl. No.: 649,687

Related U.S. Application Data

[63] Continuation of Ser. No. 470,045, May 15, 1974, abandoned.

[30] Foreign Application Priority Data
May 30, 1973   Switzerland.......................... 7840/73

[52] U.S. Cl.......................... 340/173 R; 340/173 SP
[51] Int. Cl.²................... G11C 17/00; G11C 13/00
[58] Field of Search..... 340/173 R, 173 CA, 173 SP

[56]             References Cited
             UNITED STATES PATENTS 3,098,997   7/1963   Means.......................... 340/173 CA
3,504,132   3/1970   Wallace.......................... 340/173 SP
3,614,750   10/1971  Janning.......................... 340/173 SP

*Primary Examiner*—Terrell W. Fears
*Attorney, Agent, or Firm*—Ostrolenk, Faber, Gerb & Soffen

[57]             ABSTRACT

A plug-in type program storage comprising at least a multiplicity of individual storage elements which can be electrically and mechanically disconnectably coupled with electrical data processing devices. The storage elements are constructed with the same technology as switching elements of the data storage device, and which switching elements cooperate with such storage elements, so that the information transfer from the program storage can occur without any intermediate transducer stage, and programming of the program storage is possible without the need for any special auxiliary means at the data processing device.

4 Claims, 3 Drawing Figures

PLUG-IN TYPE PROGRAM STORAGE

This is a continuation of application Ser. No. 470,045 filed May 15, 1974, now abandoned.

BACKGROUND OF THE INVENTION

The present invention relates to a new and improved construction of plug-in type program storage.

Modern data processing equipment oftentimes contains different modules or structural elements constructed as storages in which there are fixedly stored certain processing steps, so-called programs.

At the present time there is distinguished between static storages, for instance in the form of relays, capacitors, magnetic cores or complex electronic switching or flip-flop circuits, and dynamic storages in the form of magnetic tapes, magnetic plates or magnetic drums and so forth.

Usually the programs to be stored can be inserted into the storage by means of the same operating elements, such as keyboards, perforated tape readers and the like, as are employed for the insertion of the information to be processed and other commands into the devices.

Oftentimes it is desired that part of the stored information only be accessible to a certain group of people. This is true, for instance, in the case of ciphering devices where the information necessary for enciphering or deciphering respectively, the so-called Basic Key, should only be known to a limited number of people, since the device itself, once it has been programmed, is classified as "secret". For this purpose these devices are equipped for instance with mechanical locks, the keys of which are only possessed by a selective group of people.

Another security measure resides in providing plug-in type modules or units which contain permutable electrical connections which, for instance, can be changed as regards their electric function by soldering- or plug contacts. These do not constitute the actual information storage in the sense that such terminology is presently employed in the data processing art, although their function is similar thereto. As a general rule they cooperate with storages, fixedly mounted at the device, in such a way that the stored data or information can be changed with the aid of such plug-in type or insertable components in terms of their function upon the data processing operation.

Other systems are known in the art where the program carrier is in the form of a perforated or punched card, perforated tape, a magnetic card or the like, which inserts its information into the device through the agency of a reader which is mounted in or connected with the device. In this case there is generally required in the device a second operating storage, since the information stored in the foreign carrier must be transferred via the reader, which is employed as the transducer, into the device and thus is not generally available for use at any moment.

SUMMARY OF THE INVENTION

Hence, it is a primary object of the present invention to provide a plug-in type or insertable module or unit which itself can be constructed as a multiple storage.

Depending upon the intended use the plug-in type module contains a number of individual storages in the form of relays, magnetic cores or the like, which either can be programmed directly at the device itself—when the module is plugged-in or inserted—by means of the information read-in means associated with the system or however also can receive the information to be stored at specially provided programming devices. What is important is that the technological construction of the storage is exactly the same as that in the remaining device, so that the storage groups can be homogeneously integrated with the remaining functional operations and the stored information is avilable at any time to the device without the need for any additional or auxiliary information transducers or converters.

The storage also can be constructed in the form of complex, electronic switching or flip-flop stages or the like, which can fulfill their own storage capabilities with or without electrical potential. In the first instance there can be installed an electrical voltage source in the form of a capacitor or a galvanic element, wherein the possibility exists of limiting the storage duration as a function of time. By dimensioning the capacity of the voltage source there can be attained the result that a storage, which is not connected to the device, loses its information after a prescribed time. In this way there is afforded security against unlawful use thereof.

It is also conceivable to provide a simple switch, which upon being actuated disconnects the voltage source in order to likewise erase in this manner the information in the storage. This is particularly then of interest if, in the event of an emergency, it is necessary to rapidly destroy the stored information.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
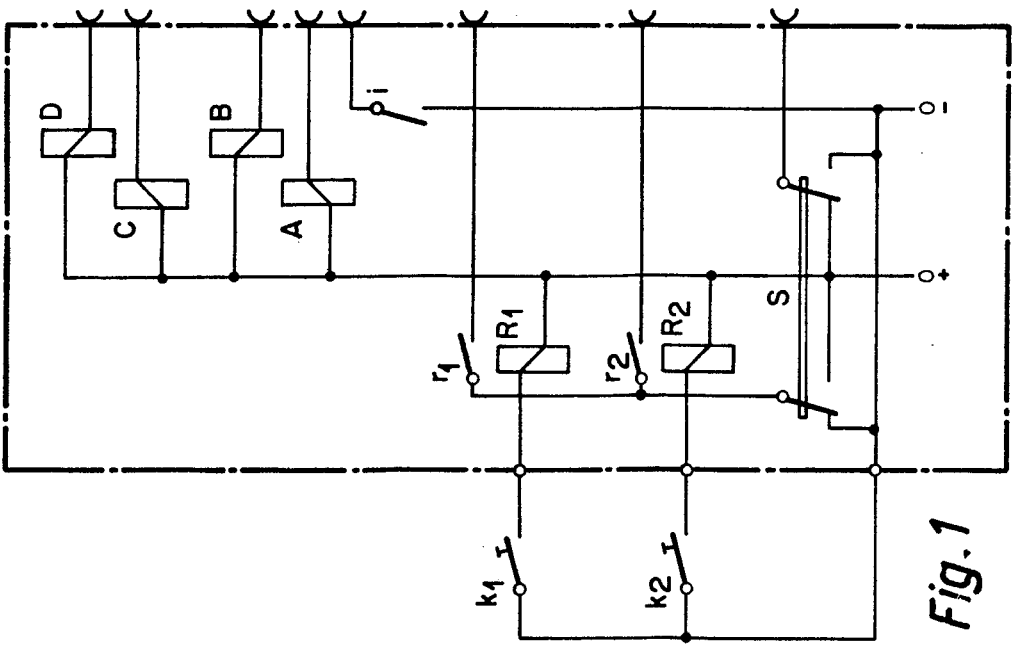
FIG. 1 illustrates a schematic circuit diagram of a simplified construction of data processing device with which there may be employed the plug-in program storages of the invention.

Describing now the drawing, in FIG. 1 there is illustrated a very simple schematically portrayed data processing device into which information can be inserted by means of the keyboard contacts $k1$ and $k2$. In the illustrated position it will be apparent that the relays $R_1$ and $R_2$ can be actuated if a suitable and therefore not particularly illustrated current supply or power source is connected with the positive (+) and negative (−) terminals. The energized relays $R_1$ and $R_2$ possess the respective contacts $r_1$ and $r_2$ which are closed when the associated relay is activated or energized.

Figure 2:
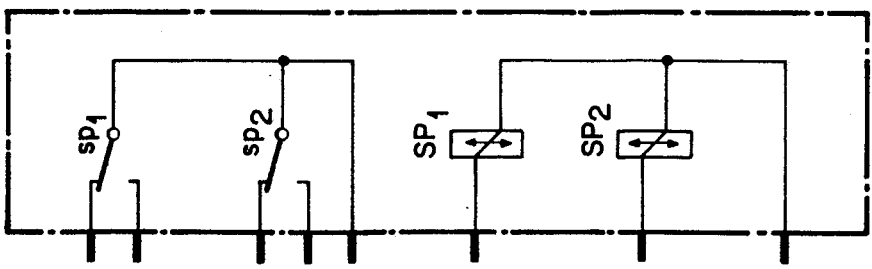
FIG. 2 is a schematic circuit diagram of a first exemplary embodiment of plug-in type program storage constructed according to the invention.

In FIG. 2 there is illustrated a first embodiment of plug-in type or insertable program storage which contains two bipolar relays SP1 and SP2 having operatively associated therewith the respective contacts sp1 and sp2.

It should be apparent that upon actuating the keyboard contacts $k1$ and/or $k2$ with the program storage of FIG. 2 plug connected with the data processing device of FIG. 1, the corresponding information will be stored in the armature positions of the two relays SP1 and SP2. Even if the program storage is removed the information remains.

If the program storage is plug connected with the data processing device of FIG. 1, then the information of the relays SP1 and SP2 can be removed at each contact sp1 and sp2 when the pulse contact $i$ in the device of FIG. 1 is actuated. Depending upon the position of the contacts there then will be actuated two relays: either A or B and either C or D, which trigger further functions at the data processing device which need not be further considered.

If the switch S is thrown, then there exists a different storage state at the relays SP1 and SP2, which upon interrogation by the contact $i$ is manifested by a different occupancy, i.e. energization of the relays A, B, C, D.

Figure 3:
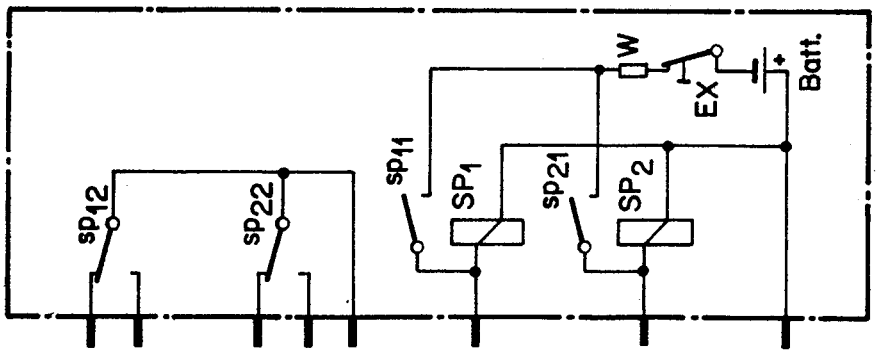
FIG. 3 is a schematic circuit diagram of a second exemplary embodiment of plug-in type program storage.

Now in FIG. 3 there is shown a further embodiment of program storage. In this case the relays SP1 and SP2 are not polarized relays; if they are energized then due to their self-holding action in their assumed state by means of contacts sp11 and sp21 in that the circuit leading from the battery "Batt" is closed via the switch "EX" and the contacts sp11 and sp21 and the coils SP1 and SP2. The resistor W serves as a contact- and battery protection device.

Once again the stored information can be removed at the contacts sp12 and sp22. The storage retains the information (energized relay SP1 and/or SP2) which has been stored even if it is disconnected from the data processing device, since the battery "Batt" can maintain the relays SP1 and SP2 in an energized state for a predetermined length of time until it has discharged. As long as the storage is connected to the data processing device of FIG. 1, then by means of a not particularly illustrated connection there can be ensured that beyond the resistance W the holding potential can be supplied by the main voltage source. In this way a battery "Batt", possibly constructed as a secondary element, also can be maintained in a state of floating charge.

In the embodiment of FIG. 3 there is furthermore shown the switch "EX". If such switch is actuated, then the possibly energized relays SP1-SP2 are de-energized and the stored information disappears, provided that the storage is not connected to the device of FIG. 1.

It should be clear that such only constitutes a very crude simplified exemplary embodiment, by means of which there can be demonstrated that it is possible to obtain progam storages for data processing devices which can be arranged to be disconnected electrically or mechanically therefrom, wherein the storage elements possess the same technology as the main components of the data processing device itself, and further wherein the transfer of information from the storage can take place without the need for any intermediate transducer or converter stage, and finally programming of the storage is possible without the need to provide special auxiliary means at the device.

It should be unnecessary to mention that other solutions, as previously mentioned, are possible and that the proposed exemplary embodiment of FIG. 1 only serves as a basis for explaining, by way of illustration, the underlying principles of the invention.

In contrast to the storage systems discussed at the outset of this disclosure, the program storage of this development possesses the following advantages:

1. The stored information only can be read-out with the aid of special auxiliary means (in the case of perforated tapes, for instance, the stored information can be ascertained by merely observing the arrangement of the perforations or holes). The same is also true for the above-mentioned pseudo-storages in the form of re-wireable plug-in groups (by visual inspection or control of the wiring the information can be read-out).
2. The storage can be programmed both at the device itself and also at certain central locations.
3. By using modern micro-electronic units or modules there can be realized a high storage capacity within very small space requirements.
4. By cleverly dimensioning a possibly installed voltage source there can be attained the result that after a certain time interval, during which the storage is not connected to the device, its information disappears, it thus loses its characteristics as a secret carrier: its loss is thus not compromised.
5. In contrast to pre-programmable plugs or perforated tapes and the like, this storage does not require any special auxiliary means for the programming operation.
6. The program can be changed very rapidly and as often as desired, there are not required any parts which are subject to any appreciable wear.
7. The information transfer from the storage to the device does not require any special transducers or converters, such as for instance perforated tape- or magnetic tape readers, since the technology is the same as the remaining switching elements of the data processing device.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. Program storage apparatus for use with an electrical data processing device having a plurality of active switching elements of a selected electrical type, each active switching element having an input and an output, said apparatus comprising:
   a plurality of continuously electrically reprogrammable active unitary storage elements of the same electrical type as said active switching elements, each unitary storage element having an input circuit adapted to receive a plurality of input states of a control signal from said output of an associated active switching element, each unitary storage element having an output circuit separate from said input circuit and adapted to settably assume one of a plurality of output states responsive to an associated one of said each element input states, each said unitary storage element output circuit controlling a quantity of electrical energy greater than another quantity of electrical energy supplied to said input circuits; and
   means for substantially simultaneously directly electrically connecting each of said unitary storage element input and output circuits to a corresponding one of the inputs and outputs of said switching elements when said program storage apparatus is installed at said electrical data processing device and for substantially simultaneously disconnecting all of said unitary storage element input and output circuits from said switching elements when said program storage apparatus is removed from said electrical data processing device.

2. Apparatus for program storage as set forth in claim 1, further including voltage source means commonly connected to each settable active unitary storage element; the output circuit of each settable unitary storage element being energized to maintain a last set output state only as long as said storage element receives a potential from said voltage source means greater than a minimum magnitude potential and being deenergized to revert to a common one of said plurality of output states responsive to said voltage source means potential being less than said minimum potential magnitude.

3. Apparatus for program storage as set forth in claim 2, further including switch means in electrical series connection with said voltage source means for disconnecting said voltage source means from all said unitary storage elements to cause all of said unitary storage element output circuits to immediately revert to said common output state.

4. Apparatus for program storage as set forth in claim 2, wherein said voltage source means is a rechargeable battery having an exactly predetermined discharge curve, said discharge curve being selective to reduce the voltage source means potential below the minimum potential magnitude to cause all of said storage element output circuits to revert to said common output state a predetermined time interval after charging of said battery is discontinued.

* * * * *